United States Patent [19]

Endo et al.

[11] Patent Number: 4,707,739

[45] Date of Patent: Nov. 17, 1987

[54] AUTOMATIC CALIBRATION CIRCUIT FOR MONITORING DEVICE

[75] Inventors: Azuchi Endo; Taizo Akimoto, both of Kanagawa, Japan

[73] Assignee: Fuji Photo Film Co., Ltd., Kanagawa, Japan

[21] Appl. No.: 823,426

[22] Filed: Jan. 28, 1986

[30] Foreign Application Priority Data

Jan. 29, 1985 [JP] Japan .................................. 60-13448

[51] Int. Cl.$^4$ ........................................... H04N 17/00
[52] U.S. Cl. .................................... 358/139; 358/168; 358/169; 358/93; 358/111
[58] Field of Search ................. 358/93, 139, 111, 112, 358/168, 169, 242, 903, 113, 231, 244; 364/571

[56] References Cited

U.S. PATENT DOCUMENTS

| | | | |
|---|---|---|---|
| 3,830,970 | 8/1974 | Hurley et al. | 358/168 X |
| 3,886,305 | 5/1975 | Yew et al. | 358/93 X |
| 3,996,420 | 12/1976 | Geluk | 358/169 X |
| 4,013,833 | 3/1977 | Zimmerman | 358/111 |
| 4,530,011 | 7/1985 | Haddick | 358/244 |
| 4,584,610 | 4/1986 | Mizokami et al. | 358/169 X |

FOREIGN PATENT DOCUMENTS

| | | | |
|---|---|---|---|
| 0023322 | 2/1979 | Japan | 358/168 |
| 615685 | 1/1986 | Japan . | |

Primary Examiner—James J. Groody
Assistant Examiner—Victor R. Kostak
Attorney, Agent, or Firm—Sughrue, Mion, Zinn, Macpeak & Seas

[57] ABSTRACT

An automatic calibration circuit for a monitoring device in which a static image, such as may be derived from an X-ray camera or an ultrasonic imaging device, is displayed as a static image on CRT and the image projected and recorded on film. A uniform pattern is displayed on the CRT by setting a contrast control signal to a minimum value and a brightness control signal to a reference level. Then, the light outputted from the face of the CRT is measured at any arbitrary point on the face of the CRT. The value so measured is used to correct the brightness signal and contrast signal so as to maintain initially set brightness and contrast values for images displayed on the CRT.

7 Claims, 5 Drawing Figures

AUTOMATIC CALIBRATION CIRCUIT FOR MONITORING DEVICE

BACKGROUND OF THE INVENTION

The present invention relates to an automatic calibration circuit for a monitoring device for an image recording apparatus in which a video signal corresponding to a static image drives a CRT of the monitoring device to display the static image thereon and that image is projected and recorded on a recording medium.

Recently, medical diagnostic apparatuses have come into common use in which static images, such as ultrasonic or X-ray diagnostic images, are converted into video signals, the video signals are applied to drive a CRT to display the images, and the images are photographed from the display surface of the CRT.

The operator of such an apparatus may make initial brightness and contrast settings while looking at a test image appearing on the CRT so that images having optimum gradation and brightness are available for photographic recording. However, even if the initial setting is satisfactory, after a time the displayed images may become unsatisfactory and the developed film unusable for diagnosic purposes because the CRT and associated electronic circuits are subject to drift over time depending on the operating conditions (temperature and humidity), resulting in undesirable brightness and contrast changes.

In order to remedy such shortcomings, the conventional apparatus utilizes the AE (automatic exposure) mechanism of a camera whereby the light at one point on the CRT is measured or the light at several points on the CRT is averaged to correct for such drift. However, the measured brightness of the image may still different from what is desired because of differences in position, background color, etc. Consequently, this correction method is not fully acceptable.

SUMMARY OF THE INVENTION

The present invention is intended to remedy the above-described drawbacks, and it is therefore an object of the invention to provide an automatic calibration circuit for a monitoring device for an image recording apparatus in which the image quality initially set on a CRT is always maintained despite variations with time and position on the CRT.

The above-described and other objects are accomplished by regenerating the video signal of a static image on the CRT of a monitoring device, projecting and recording the signal on a recording medium in an image recording apparatus, wherein, to effect maintenance of the brightness and contrast of the image at desired levels, first, the contrast control signal is set to a minimum value and the brightness control signal is set to a reference level so as to produce a uniform pattern on the CRT. The brightness of the pattern is then measured and the result stored using a light detecting element arranged at any position on the face of the CRT. The brightness and contrast control signals are then corrected to maintain the initially set value brightness and contrast of the displayed images.

DESCRIPTION OF THE PREFERRED EMBODIMENTS

Referring now to the accompanying drawings, the preferred embodiments of the present invention will be described.

Figure 1:
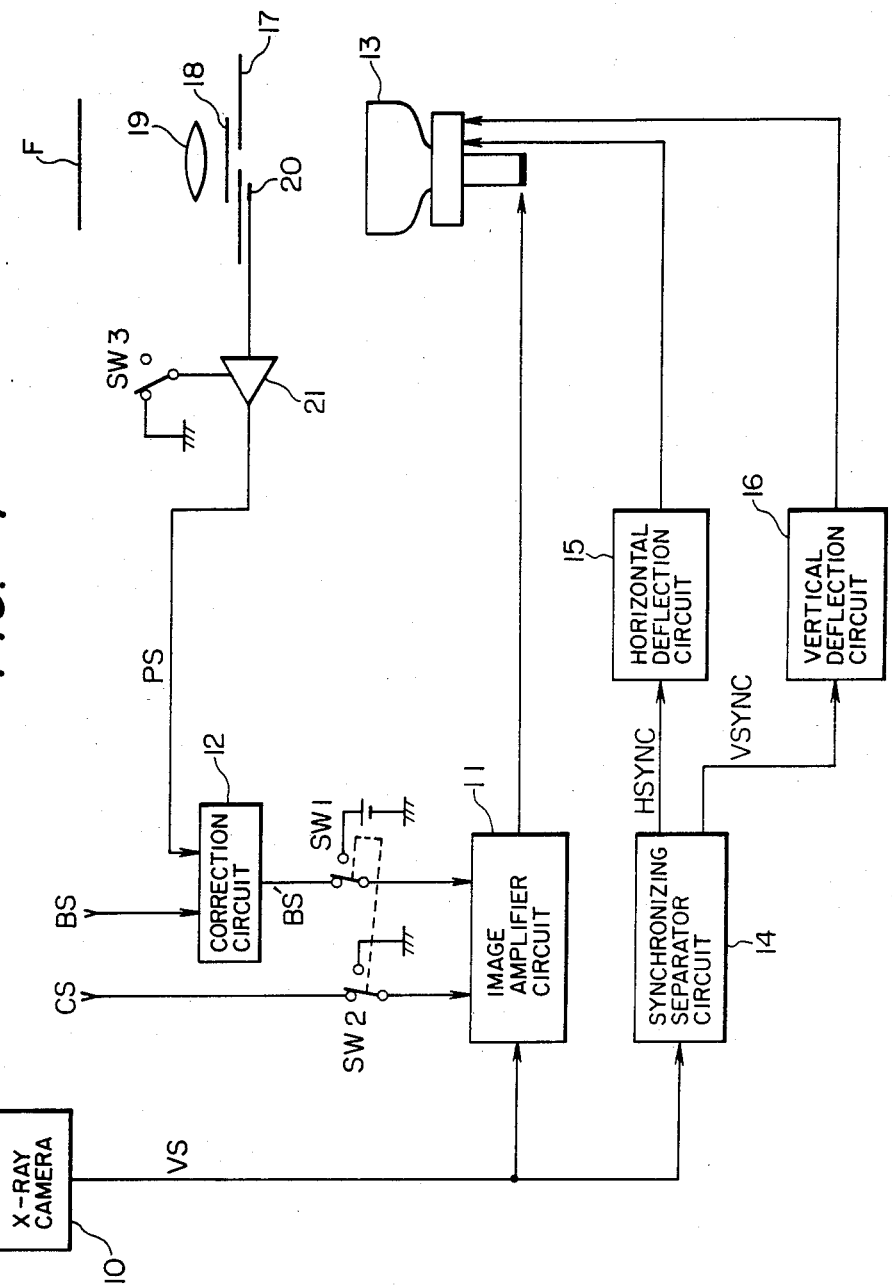
FIG. 1 shows an automatic calibration circuit diagram of a monitoring device embodying the present invention.

FIG. 1 shows an automatic calibration circuit of a monitoring device constructed in accordance with the present invention.

In this example, an X-ray image is provided in the form of a video signal VS by a X-ray camera 10 of known construction. The invention is equally applicable, however, to the case where the image signal is provided by an ultrasonic probe or other imaging device.

The video signal VS from the camera 10 is supplied to an image amplifier circuit 11 and a synchronizing separator circuit 14. The image amplifier circuit 11 amplifies the image signal so that the image signal has desired optimum brightness and contrast levels. A brightness control signal BS is applied to the image amplifier circuit 11 through a correction circuit 12 and a switch $SW_1$ (described in detail below), whereas a contrast control signal CS is applied thereto through a switch $SW_2$. The levels of the brightness control signal BS and the contrast control signal CS are adjustable manually by corresponding controls, the initial settings of which are carried out at the time of equipment installation such as by using a pattern generator or a reference signal. The output of the image amplifier circuit 11 is applied to a CRT 13.

A horizontal synchronizing signal HSYNC and a vertical synchronizing signal VSYNC are separated from the video signal VS by a synchronizing separator circuit 14. The synchronizing signals HSYNC and VSYNC are respectively supplied to horizontal and vertical deflection circuits, which in turn drive the deflection coils of the CRT 13, whereby image of the signal from the X-ray camera 10 is displayed on the CRT 13.

The image display on the CRT 13 is recorded on a film F through an optical system including a diaphragm 17, a shutter 18, and an image forming lens 19.

An optical sensor 20 for measuring the brightness of the image displayed on the CRT 13 is arranged between the tube surface of the CRT 13 and the diaphragm 17. For the optical sensor 20, there may be used elements such as a photodiode, phototransistor or CdS photocell. The output of the optical sensor 20 is connected to a peak detecting circuit 21 having a holding function. The hold control terminal of the peak detecting circuit 21 is connected through a switch $SW_3$ to ground.

Figure 2:
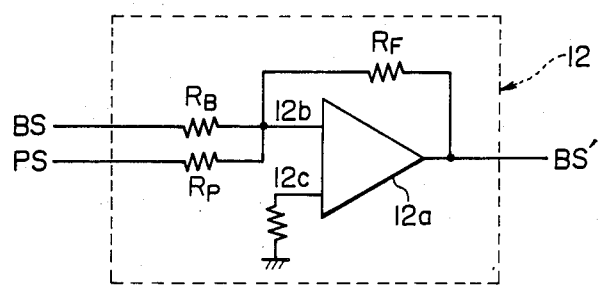
FIG. 2 shows an example of a correction circuit of FIG. 1.

The output PS of the peak detecting circuit 21 is applied to the correction circuit 12. The correction circuit 12 may be arranged as shown in FIG. 2, for instance, wherein the brightness control signal BS and the peak value output PS are summed by resistors RB and RP and the sum applied to the input terminal 12b of an amplifier 12a. The output of the amplifier 12a is fed back to the input terminal 12b through a feedback resistor RF, whereby a brightness signal BS' (=BS·RF/RB+PS·RF/RP) corrected by the peak value output PS is outputted. The other input terminal 12c of the amplifier 12a is grounded.

The above-described switches SW$_1$, SW$_2$ and SW$_3$ are arranged to operate interlockingly, i.e., SW$_1$ and SW$_2$ are connected so as to respectively supply the brightness control signal BS, corrected by the correction circuit 12, and the contrast signal BC to the image amplifier circuit 11 when the power supply of the monitoring device is ON and while the automatic calibration circuit is not operating. SW$_3$ is connected so as to make the peak detecting circuit 21 hold previously detected peak data when it is closed. While the automatic calibration circuit is operating, the center terminal of SW$_1$ is connected to a reference generator which produces a reference brightness value and SW$_2$ is set to ground to minimize the contrast value. At the time, SW$_3$ is opened so that the peak detecting circuit is not locked but instead will hold its input voltage.

Figure 3:
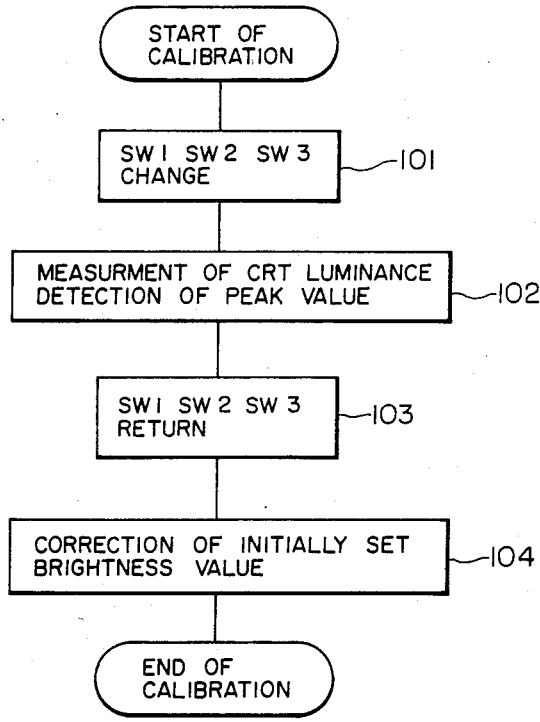
FIG. 3 is a flowchart illustrating the operation of the circuit of FIG. 1.

Referring to the flowchart of FIG. 3, the operation of this apparatus will be described.

When commencement of calibration is instructed by a timer or manual switch after the image recorder is started and a fixed interval of time has elapsed, SW$_1$, SW$_2$ and SW$_3$ are switched, and the brightness control signal applied to the image amplifier circuit 11 is set to a reference signal level, whereas the contrast control signal is grounded to minimize the contrast. Consequently, the image amplifier circuit 11 supplies a brightness signal to the CRT 13 (irrespective of the image signal from the X-ray camera), and hence an image with a brightness corresponding to the reference brightness signal is displayed on the CRT. The control terminal of the peak detecting circuit 21 is opened by operation of the switch SW$_3$, releasing the circuit 21 from holding the previously detected peak value, whereupon detection of a new peak value is started (Step 101).

The brightness of the image on the tube surface of the CRT 13 is measured by the optical sensor 20 arranged in front of the tube surface. The peak value of the output of the optical sensor 20 is then detected by the peak detecting circuit 21 (Step 102).

When the termination of calibration is instructed by the timer or manual switch after a fixed interval of time, the brightness control signal BS and the contrast control signal CS are respectively applied through SW$_1$ and SW$_2$. With SW$_3$ grounded, the peak detecting circuit 21 holds the peak voltage level it is currently providing until SW$_3$ is opened (Step 103).

The peak value signal PS thus held is applied to the correction circuit 12, and a correction value is computed according to the peak value signal PS, which correction value is added to the brightness control signal BS initially set. The correction value will be negative if the peak value signal PS thus held is greater than a value corresponding to the brightness control signal BS initially set (when the brightness of the CRT is high) and positive when the peak value signal PS thus held is smaller than a value corresponding to the brightness control signal BS initially set (when the brightness of the CRT is low), and hence the brightness control signal BS initially set is corrected (Step 104).

As the output of the data holding circuit applied to the correction input terminal of an operational amplifier decreases when the brightness of the tube surface of the CRT rises because of variations of the CRT over time or due to a temperature rise, the calibration circuit operates to cause the output to decrease and correct the brightness of the tube surface to the level equivalent to what was initially been set.

Although the peak value is detected using the peak detecting circuit 21 after the brightness of the tube surface of the CRT 13 is measured in the above-described embodiment, an integrating circuit may be used to obtain an integrated value and calculate a correction value by holding the integrated value and inputting it to the correction circuit 12. It is also possible to correct the brightness by superposing the brightness correcting signal BS on the brightness signal of the image amplifier circuit 11 without correcting the brightness correcting signal BS.

Figure 4:
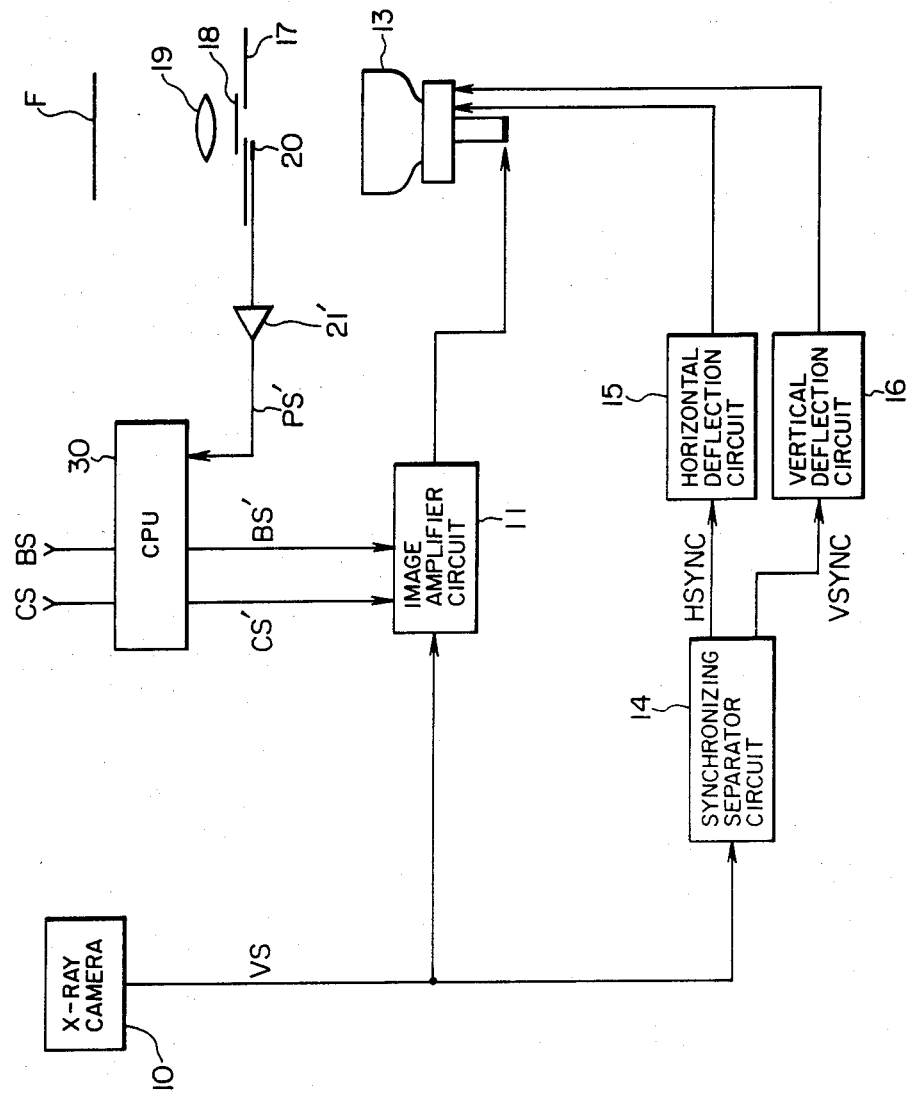
FIG. 4 shows another automatic calibration circuit embodying the present invention.

Referring to FIG. 4, another embodiment of the present invention will be described. In FIG. 4, a microcomputer is used to automatically carry out the correction process using the automatic calibration circuit of the monitoring apparatus of FIG. 1. Like reference characters or numerals in designate like circuit elements of FIG. 1.

A CPU 30 is an ordinary microcomputer and includes a ROM wherein an automatic brightness/contrast calibrating program has been stored, a RAM for temporarily storing data stored in the ROM according to the program and a measured peak value signal PS' supplied by a peak detecting circuit 21', a processor for processing the data in the RAM according to the program stored in the ROM and calibrating the brightness and contrast values, and an I/O circuit for inputting and outputting signals to and from the CPU, the CPU 30 being used to correct the brightness control signal BS and the contrast control signal BC based on the peak value signal PS' from the peak detecting circuit 21'. The brightness control signal BS' and the contrast control signal CS' thus corrected by the CPU 30 are applied to an image amplifier circuit 11 so that the brightness and contrast of a CRT 13 are controlled.

Figure 5:
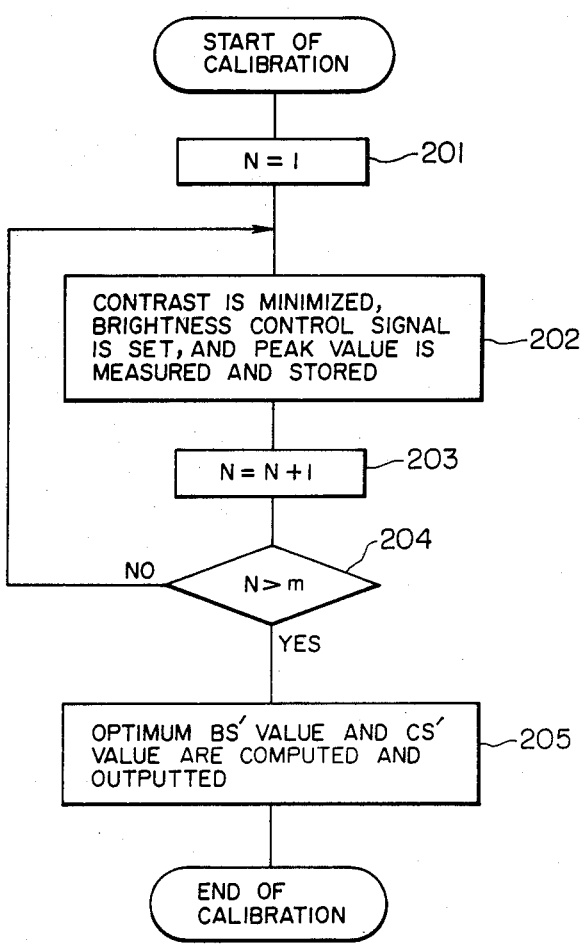
FIG. 5 is a flowchart illustrating the operation of the circuit of FIG. 4.

Referring to FIG. 5, the automatic calibrating process using the CPU 30 will be described. When the calibrating operation is started, a data value N indicating a number of measurements is initially set at 1 (Step 201). Subsequently, the contrast is minimized (set to zero) and the brightness of the image display on the face of the CRT is measured by setting the value of the brightness control signal to BS', whereas the RAM is made to store the peak value PS' of the peak value detecting circuit 21' (Step 202). Then 1 is added to N to provide a new value of N (Step 203) and the values of N and a value m are compared (Step 204). If N is smaller than m, the value of the brightness control signal will be changed and then the peak value will be measured and stored. If N is greater than m, the measurement of the peak value will be terminated (m times) and an optimum brightness control signal BS' as well as an optimum contrast control signal CS' will be computed from the data measured m times before being outputted (Step 205). To the optimum values of the brightness control signal BS' and the contrast control signal CS', a method may be employed of storing the tabulated peak value data measured by the optical sensor with contrast=0 and brightness=BN (N=1 ... m) in the ROM (the values are assumed P$_1$, P$_2$..., PM), obtaining the sum of squares PT (=(PS$_1$−P$_1$)+(PS$_2$−P$_2$)$^2$ + ... +(PS$_m$−P$_m$)$^2$) of the differences between the stored data and the actually measured data values (PS$_1$, PS$_2$, ... PS$_m$), and setting the brightness control signal BS and the contrast control signal CS' so that the sum of squares PT is minimized. The values of the brightness control signal BS and the contrast control signal CS are thus corrected and the calibrating operation is completed.

Although both the brightness control signal BS and the contrast control signal are corrected in the above-described embodiment, only the brightness control signal BS may be corrected as in the case of the embodiment of FIG. 1. In this case, the brightness need not be changed for measurement and a single measurement of the brightness is sufficient.

Although the present invention has been described by reference to two examples, its application is not limited to those examples. Basically, the setting of the contrast control signal should be minimized and the brightness control signal should be set to a reference level to generate a uniform pattern on the CRT. The brightness of the pattern should be measured and stored using a light detecting element arranged at any position on the CRT and the brightness signal adjusted so that the brightness is maintained at the initially set value. Various operating circuits may be used to set the new brightness value.

As set forth above, changes in the brightness of a CRT caused by environmental changes of variations with time can be corrected and the initially set image quality maintained.

We claim:

1. An automatic calibration circuit for a monitoring device in which a static image is displayed on a CRT and projected and recorded on a recording medium, the apparatus including an image amplifier circuit for amplifying an image signal to be applied to said CRT in accordance with a brightness control signal and a contrast control signal, wherein the improvement comprises: means for setting said contrast control signal to a minimum value and simultaneously setting said brightness control signal to a reference level; means for measuring the brightness of light at any position on the face of said CRT while said contrast control signal is at said minimum value and said brightness control signal is at said reference level; and means for correcting at least one of said brightness control signal and said contrast control signal in accordance with the brightness value thereby measured so as to maintain a predetermined image brightness and contrast on said CRT.

2. The automatic calibration circuit of claim 1, wherein said correcting means comprises means for summing a signal having a predetermined relationship with said measured brightness value with said brightness control signal.

3. The automatic calibration circuit of claim 1, wherein all of said means are implemented with single microprocessor means.

4. An automatic calibration circuit for a monitoring device of the type including a CRT, means providing an image signal corresponding to an image to be displayed on said CRT and amplifier means for amplifying said image signal in accordance with brightness and contrast control signal and for providing the amplified image signal to said CRT for display, said calibration circuit comprising:

means for providing a reference brightness value as said brightness control signal during a calibration time interval;
means for providing a reference contrast value as said contrast control signal during said calibration time interval;
detecting means for detecting the brightness level of at least one point on said CRT during said calibration time interval to obtain a brightness correction signal;
means for providing a desired value for said contrast control signal after said calibration time interval;
means for providing a desired value for said brightness control signal after said calibration time interval;
means for correcting said brightness value in accordance with said brightness correction signal to obtain a corrected brightness control signal and for applying said corrected brightness control signal to said amplifier means.

5. An automatic calibration circuit as defined in claim 4, wherein said correcting means further corrects said contrast value in accordance with said brightness correction signal to obtain a corrected contrast control signal and supplies the corrected brightness control signal to said amplifier means.

6. An automatic calibration circuit as defined in claim 4, wherein said detecting means comprises means for providing a detection signal corresponding to the brightness of at least one position on said CRT during said calibration time interval, and peak hold means for providing an output signal representing the peak value of said detection signal during said calibration time interval.

7. An automatic calibration circuit as defined in claim 4, wherein said reference contrast value is a minimum level.

* * * * *